United States Patent [19]
Klaue

[11] 3,870,118

[45] Mar. 11, 1975

[54] BRAKE ARRANGEMENT FOR VEHICLES

[76] Inventor: Hermann Klaue, 24, Tour D'Ivoire, 1820 Montreaux, Switzerland

[22] Filed: Feb. 7, 1973

[21] Appl. No.: 330,432

Related U.S. Application Data

[63] Continuation-in-part of Ser. No. 190,615, Oct. 19, 1971, abandoned.

[30] Foreign Application Priority Data

| Oct. 26, 1970 | Germany | 2052420 |
| Feb. 10, 1972 | Switzerland | 1932/72 |
| Apr. 7, 1972 | Switzerland | 5122/72 |
| June 21, 1972 | Switzerland | 9338/72 |

[52] U.S. Cl. ............................. 180/75, 188/264 D
[51] Int. Cl. .............................................. B60t 5/00
[58] Field of Search ............ 180/75; 188/71.5, 71.6, 188/73.6, 264 D; 192/70.13

[56] References Cited
UNITED STATES PATENTS

| 1,166,764 | 1/1916 | Kaiser | 180/75 |
| 1,305,029 | 5/1919 | Tibbetts | 192/70.13 |
| 2,016,359 | 10/1935 | Corbin | 188/71.5 |
| 2,051,286 | 8/1936 | Boykin | 188/264 D X |
| 2,753,017 | 7/1956 | Curl | 180/82 R |
| 2,821,271 | 1/1958 | Sanford | 188/264 D |
| 2,954,262 | 9/1960 | Osborne | 180/82 R |
| 3,000,470 | 9/1961 | Milan | 188/264 D |
| 3,095,762 | 7/1963 | Baker | 180/75 |
| 3,134,458 | 5/1964 | Westcott | 188/71.6 X |
| 3,164,223 | 1/1965 | Kemp | 188/71.5 X |

FOREIGN PATENTS OR APPLICATIONS

| 275,304 | 5/1951 | Switzerland | |

*Primary Examiner*—David Schonberg
*Assistant Examiner*—Terrance L. Siemens
*Attorney, Agent, or Firm*—Larson, Taylor and Hinds

[57] ABSTRACT

A brake arrangement for trailers and truck-trailer combinations including a liquid-cooled disc brake. The disc brake is mounted in the axle body extending between an opposed pair of non-driven wheels. The non-rotational portion of the disc brake comprises a set of brake rings each liquid-cooled, the brake rings being fixed against rotational movement but movable axially along the axle tube. Axle shaft parts extend from the disc brake outwardly to each of the two wheels or to planetary gearings located in these wheels to which the axle shaft parts are connected at their outer ends for rotation therewith. At their inner ends the axle shaft parts include brake laminations positioned between the brake rings, the laminations being movable axially along the axle shaft parts but fixed against rotation relative thereto. At least one of the brake rings is movable axially to effect frictional engagement between the brake rings and the brake laminations to brake the wheels. The liquid compartments of the disc brake are in fluid communication with a heat exchanger for liquid circulation therebetween. A trailer having two non-driven axles includes liquid-cooled disc brakes, the trailer being equipped with an anti-locking system including sensors and planetary gearings in the wheels braked by the liquid-cooled disc brakes.

12 Claims, 17 Drawing Figures

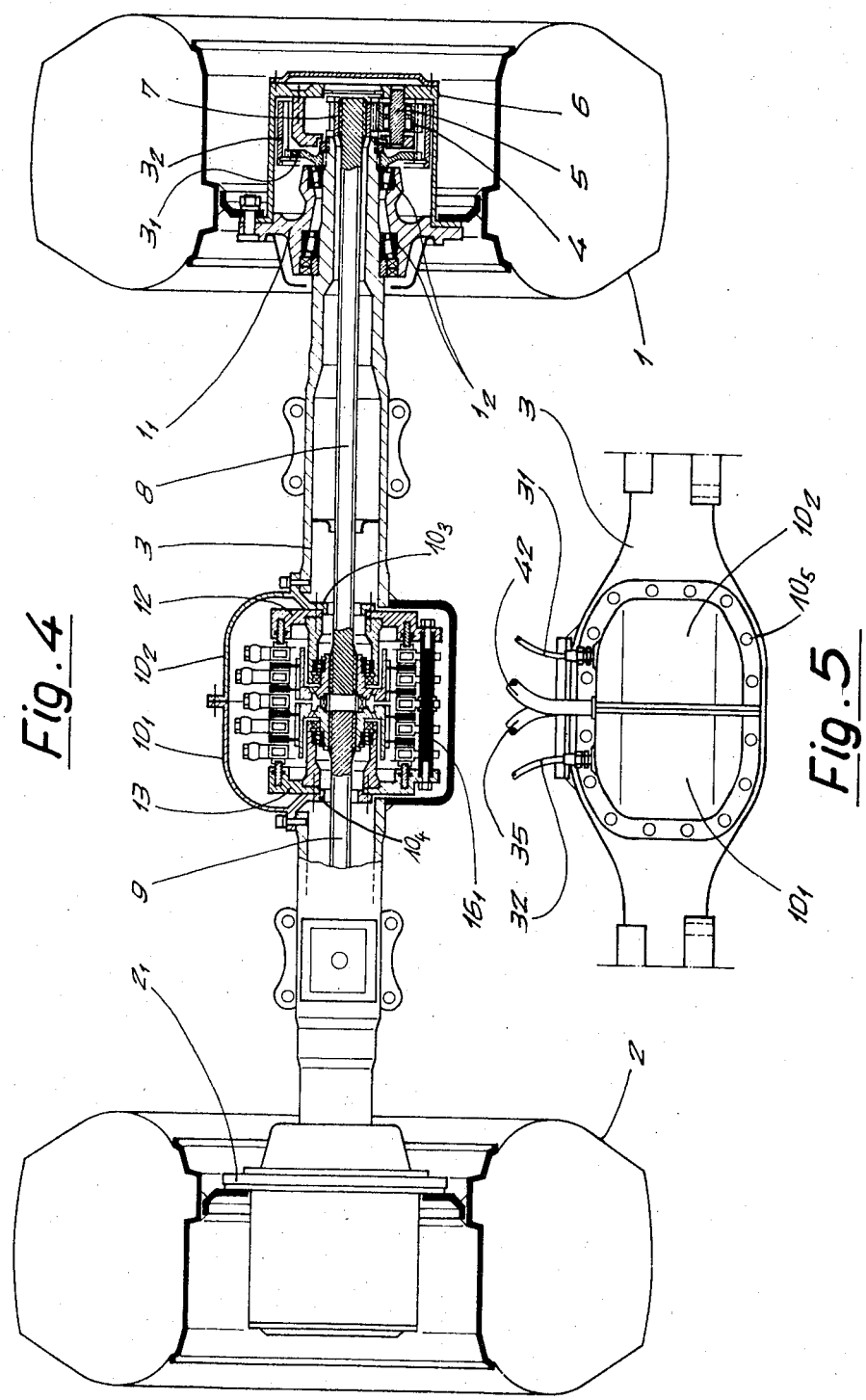

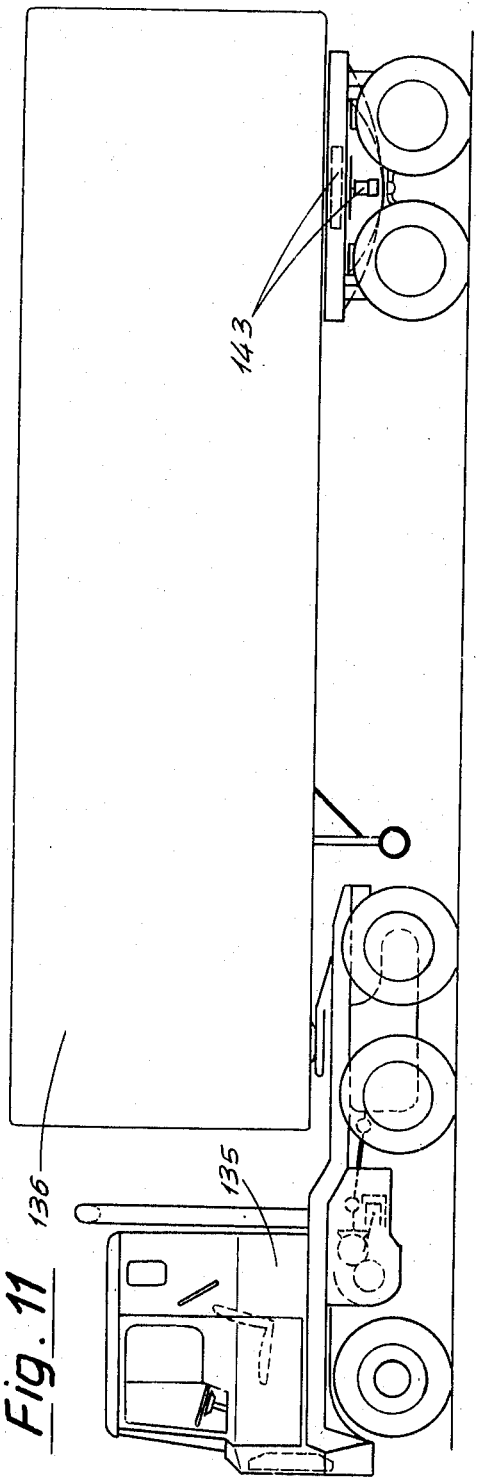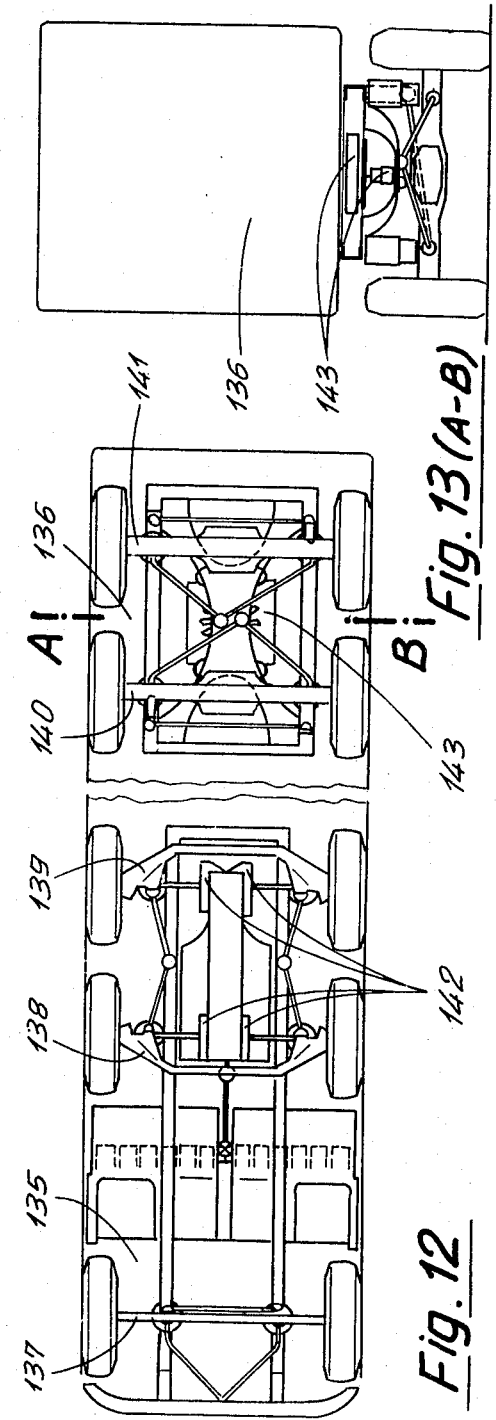

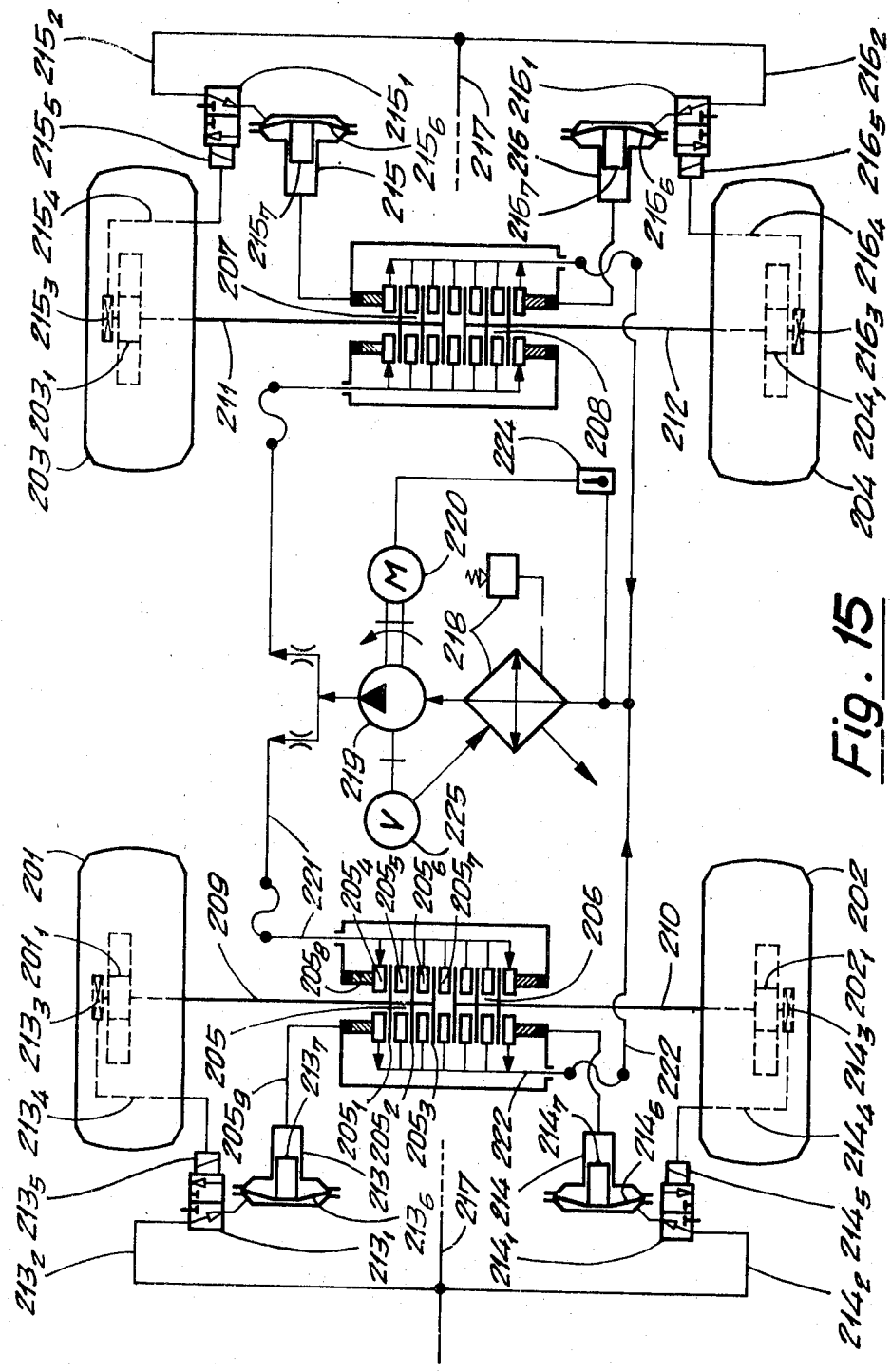

BRAKE ARRANGEMENT FOR VEHICLES

This application is a continuation-in-part of my co-pending application, Ser. No. 190,615, filed Oct. 19, 1971, now abandoned.

BACKGROUND OF INVENTION

This invention relates to a brake arrangement for trailers and truck-trailer combinations including a liquid cooled disc brake for the non-driven wheels.

For the increasing average operating speed of heavy trucks and particularly their trailers the normal drum brakes are adequate for permanent braking only at comparatively low speeds so that the flow of traffic on mountainous roads is adversely affected by such vehicles. Again, experience shows that no improvements are secured with heavy vehicles by the use of partially lined disc brakes. In order to remedy this, axles for trailers are being developed in which an additional drive for a retarding device of hydrodynamic or electrical design operated at a stepped-up speed of rotation is provided. Such installations require large expenditure, increase the unsprung masses and constitute a compromise inasmuch as hydrodynamic and electrical devices cannot replace the brakes additionally installed in the wheels. By way of example, electrical retarders are known, the application of which to ten ton axles involves an extra weight of 500 kg per axle with substantial extra costs. Such as increase of the unsprung masses impairs the road-holding properties of the vehicle quite considerably. A further disadvantage resides in the fact that, with anti-dragging devices indispensible in the future, the torque curve of retarders will make locking regulators associated with the wheel brakes illusory.

Accordingly, it is the main object of this invention to provide a new brake arrangement for heavy vehicles comprising non-driven axles provided with brakes suitable for permanent braking operation. The brake assembly of the brake arrangement is located in the axle body of the non-driven axle.

It is a further object of this invention to reduce the size and the mass of the unsprung brake assembly.

It is a further object of this invention to facilitate the removal of worn parts of the brake assembly.

Another object of the invention is the provision of planetary gearings and/or anti-locking sensors in the wheels associated with the brake arrangement.

A further object of this invention is the provision of a brake arrangement for truck-trailer combinations and for semi-trailer units.

The foregoing and other objects and advantages will become apparent in view of the following description taken in conjunction with the drawings, wherein:

FIG. 4 is a vertical section through a preferred embodiment of a non-driven axle according to the invention showing the preferred braking unit in section;

FIG. 5 is a top plan view of the closed axle body of the axle of FIG. 4;

FIG. 11 is a side view of a truck-tractor with a semi-trailer employing a brake arrangement according the invention;

FIG. 12 is a bottom plan view of the vehicles of FIG. 11;

FIG. 13 is a rear elevational view of the vehicles of FIG. 11;

FIG. 15 is a plan view of a brake system applied to a tandem axle of a semi-trailer embodying another modification of the invention;

My invention of a vehicle brake arrangement, comprises in combination:

a vehicle provided with at least one pair of oppositely located non-driven wheels and an elongated hollow axle body attached to the said vehicle and extending between the said wheels;

a liquid-cooled disc brake located in the axle body, said disc brake comprising a set of brake rings being fixed against rotation but movable axially in the longitudinal direction of the axle body;

a divided axle shaft located in the axle body and consisting of a left and a right part, each part having an inner end at the disc brake and an outer end located in said wheels, each said axle shaft parts being pullable outwardly from the axle body to the left and to the right, respectively;

at least one brake lamination having friction linings and being removably fixed on each of said inner ends of the axle shaft parts for rotation therewith, said brake laminations located between said brake rings;

said axle body having an opening closed by a removable cover through which opening the complete braking assembly can be pulled out after the axle shaft parts have been pulled out partly.

Figure 2:
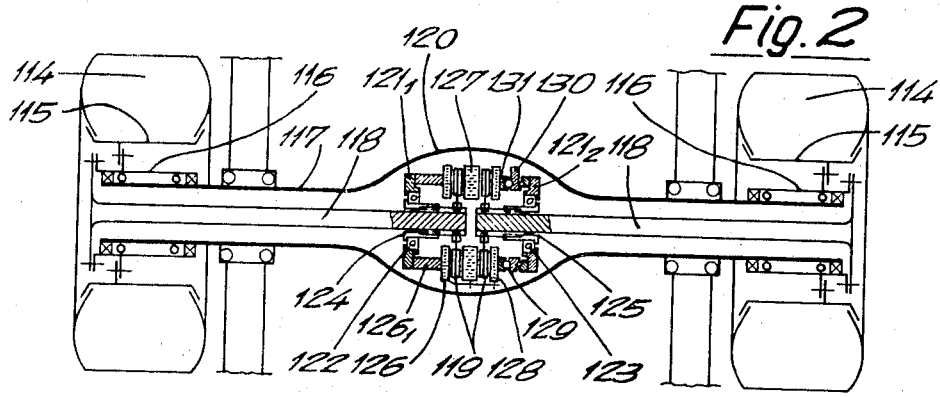
FIG. 2 is a horizontal section through a non-driven axle of a trailer according to an embodiment of the invention.
Figure 3:
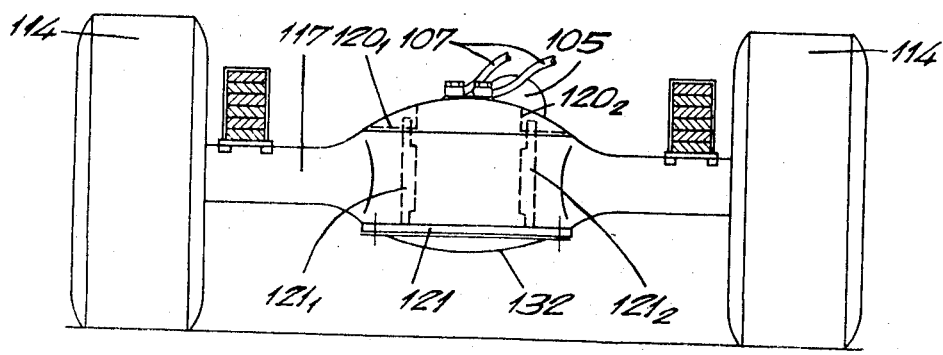
FIG. 3 is a front view of the axle of FIG. 2.
Figure 1:
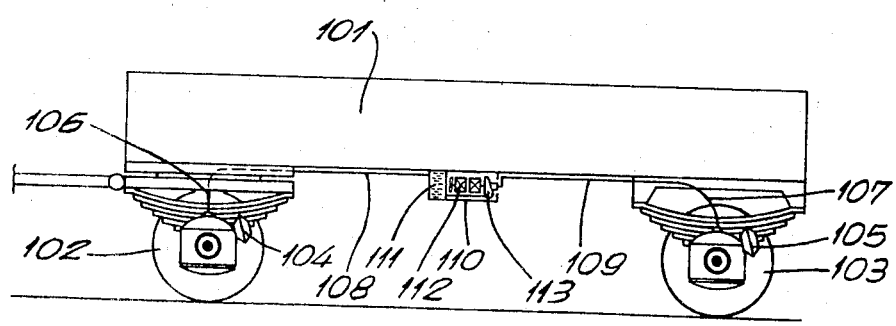
FIG. 1 is a side view of a trailer employing a brake arrangement embodying the principles of the invention.

The main principles of the invention are shown first in connection with FIGS. 1 to 3 applied to a trailer. Referring to FIG. 1, the brake arrangement of this vehicle consists of the trailer body 101, the wheels 102 and 103 and the compressed air diaphragm cylinders 104 and 105 for actuating the brake. According to an embodiment of the invention and as described in detail further below, the brake assembly includes liquid-cooled disc brakes located in the axle body. The conduits 106 and 107 and the pipe conduits 108 and 109 connect the brake assembly with the heat exchanger 110. The heat exchanger 110 includes the radiator 111 and the electrically driven fan 112 and cooling water pump 113. FIGS. 2 and 3 show a first and simple embodiment of the invention as applied to the trailer of FIG. 1 provided with the wheels 114 and the rims 115 removably mounted on the hubs 116. The hubs 116 are journalled on the hollow axle body 117.

Located in the axle body is the divided axle shaft of so-called banjo type, comprising two shaft parts 118. The outer ends of the shaft parts 118 are provided with flanges and bolted by means of screws to the hubs 116 for rotation therewith. The inner ends of the axle shaft parts are each formed with a spline profile carrying thereon at least one brake lamination. The brake laminations are movable axially on their respective shafts 118 but fixed against circumferential movement relative thereto and are provided with friction linings on each side.

The middle part of the axle body 117 is widened and encloses the brake assembly. The axle body includes a cap 120 welded thereon and an annular flange 121. The annular flange 121 is bolted with its extensions $121_1$ and $121_2$ from the underside to extensions $120_1$ and $120_2$ of the cap 120. A removable cover 132 is bolted to the flange 121 and closes an opening in the axle body. Accommodated in the extensions $121_1$ and $121_2$ are encapsuled bearings 122 and 123 journalling the left and right shaft parts 118 via sleeves 124 and 125. The laminations 119 are disposed between the brake rings 126, 127 and 127, 128, respectively. The brake rings 126, 127 and 128 are held against circumferential movement but, except for brake ring 126, are movable in the axial direction. The brake ring 126 is fitted by its cylindrical extension $126_1$ to the extension $121_1$ of the annular flange 121. The brake ring 128 is in connection with a spreading device 129 mounted on the extension $121_2$. The spreading device comprises a rotable actuating ring 130 journalled on ball bearings and balls 131 in ramps provided between the brake ring 128 and the actuating ring 130. To actuate the braking operation, the cylinders 104 and 105 operate a level which causes a rotation of the actuating ring 130 and an axial movement of the brake ring 128.

The brake rings 126, 127 and 128 are liquid cooled and include liquid compartments, which are in fluid communication with the heat exchanger for liquid circulation therebetween. A detailed description of a preferred circulation system will be given in the following embodiments of the invention. After removal of the cover 132 and lossening the bolts the brake laminations 119 can be removed after the shaft parts 118 have been pulled out sufficiently for releasing the brake laminations from the splined shaft sections. Thus, the worn parts of the brake assembly can be changed without emptying the brake rings. With this brake design the wheels are free to turn in curves in both the braked and the unbraked conditions.

FIGS. 4-8 show a preferred embodiment of a water cooled disc brake assembly located in the axle body of a non-driven axle.

The object was to provide a brake assembly of smaller size in order to reduce the unsprung mass. This is achieved by the provision of planetary transmission gearings located in the wheels enabling the reduction of the braking moment acting on the axle shafts. Because of the use of a liquid cooling system it is possible to operate the brake with high specific thermal loading capacity enabling increased speed of the laminations relative to the wheels and a reduction of the braking moment. A further advantage of this embodiment is the easy disassembly of the brake parts.

This has been achieved by fastening parts of the brake assembly to the cover of the opening in the axle body so that, after pulling out the axle shafts, the complete brake assembly can be pulled out from the axle body when removing the cover without opening the fluid connections.

Another feature of this embodiment is the provision of bearing means for the axle shaft parts enabling their lubrication by the same lubrication circulation system provided for the axle. The brake is preferably operated from both sides by hydraulic or pneumatic actuated rings unlike the operation shown in FIGS. 2 and 3. Thus, by fastening the middle brake ring advantageously an equal braking action on both wheels is acheived which enables the provision of anti-locking devices in those wheels. Referring now to FIGS. 4-8 the hubs $1_1$ and $2_1$ of the wheels 1 and 2 are journalled by the roller bearings $1_2$ on the axle body 3. Located within the axle body 3 is the divided axle shaft of banjo type consisting of two identical shaft parts 8 and 9. Each shaft part is formed at its inner end as well as at its outer end with splined profiles. The shaft parts are driven by planetary gear arrangements provided in the wheels. In FIG. 4 the planetary transmission is only shown for wheel 1. The planetary gear arrangement includes a sun gear 7 axially movably mounted on the splined shaft part end. The sun gear 7 is surrounded by a plurality of planetary gears 4 engaging an outer ring gear $3_2$ mounted on a flange $3_1$ of the axle body 3. A drum-like frame 6 mounted to the hub $1_1$ engages the pins 5 of the planetary gears 4 for rotation therewith.

In the middle of the axle body is a hollow space having a cover consisting of the two parts $10_1$ an $10_2$. The cover parts $10_1$ and $10_2$ are formed with the extensions $10_3$ and $10_4$, respectively which extend into the interior of the axle body (FIG. 4).

The extensions $10_3$ and $10_4$ have fastened by means of the screws 11 the flanges 14 and 15 and the brake carriers 12 and 13 respectively, the latter each being provided with an annular cylinder for operating the brake.

Three circumferentially spaced bolts $16_1$, $16_2$ and $16_3$ are arranged between the carriers 12 and 13 and fastened thereto.

The bolts $16_1$, $16_2$ and $16_3$ provide abutments for the brake rings $17_1$ to $17_7$, wherein the brake rings $17_1$ to $17_3$ and $17_5$ to $17_7$ are movable in the axial direction whilst the middle brake ring $17_4$ is fastened against axial movement by two spring rings in the middle of the bolts. The brake rings $17_1$ to $17_7$ have hollow compartments designed for a water circulation therethrough and they are made preferably of copper comprising 1 percent chronium.

The ends of the axle shaft parts 8 and 9 are formed with a splined profile providing a guide for two hub members 20 and 21 respectively, mounted thereto. The axle shafts 8 and 9 are journalled on the flanges 14 and 15 by means of the roller bearings 18 and 19 located between the flanges 14 and 15 and the hub members 20 and 21, respectively. The hub members 20 and 21 carry the laminations $22_1$ to $22_3$ and $22_4$ to $22_6$ on their circumference which is shaped with a toothed profile causing the laminations to be movable in the axial direction but held against circumferential movement. The axle body compartments $3_3$ and $3_4$ are partly filled with oil and sealed by sealing means against the brake space 23. The sealing means comprise two shaft-sealings 24 and 25 located between the flanges 14, 15 and the hub members 20, 21, respectively, and further comprise a sealing member 26 rotating with the hub members and the axle sealings 27 and 28.

Disposed within the brake carriers 12 and 13 are the ring pistons 29 and 30 axially movable in annular spaces and sealed by the sealing rings $12_1$, $12_2$ and $13_1$, $13_2$. Into these annular spaces hydraulic liquid is delivered through the conduits 31 and 32 during the braking operation. The wheel 1 is braked when the ring piston 29 presses the laminations $22_1$ to $22_3$ and the brake rings $17_1$ to $17_4$ together. Accordingly the wheel 2 is braked by piston 30, laminations $22_4$ to $22_6$ and brake rings $17_4$ to $17_7$.

The brake ring $17_4$ fastened to the bolts $16_1$, $16_2$, $16_3$ provides a stop for the left hand and the right hand brake. Insulated thrust rings 33 and 34 are arranged in between the ring pistons 29 and 30 and the brake rings $17_1$ and $17_7$, respectively.

Figure 7:
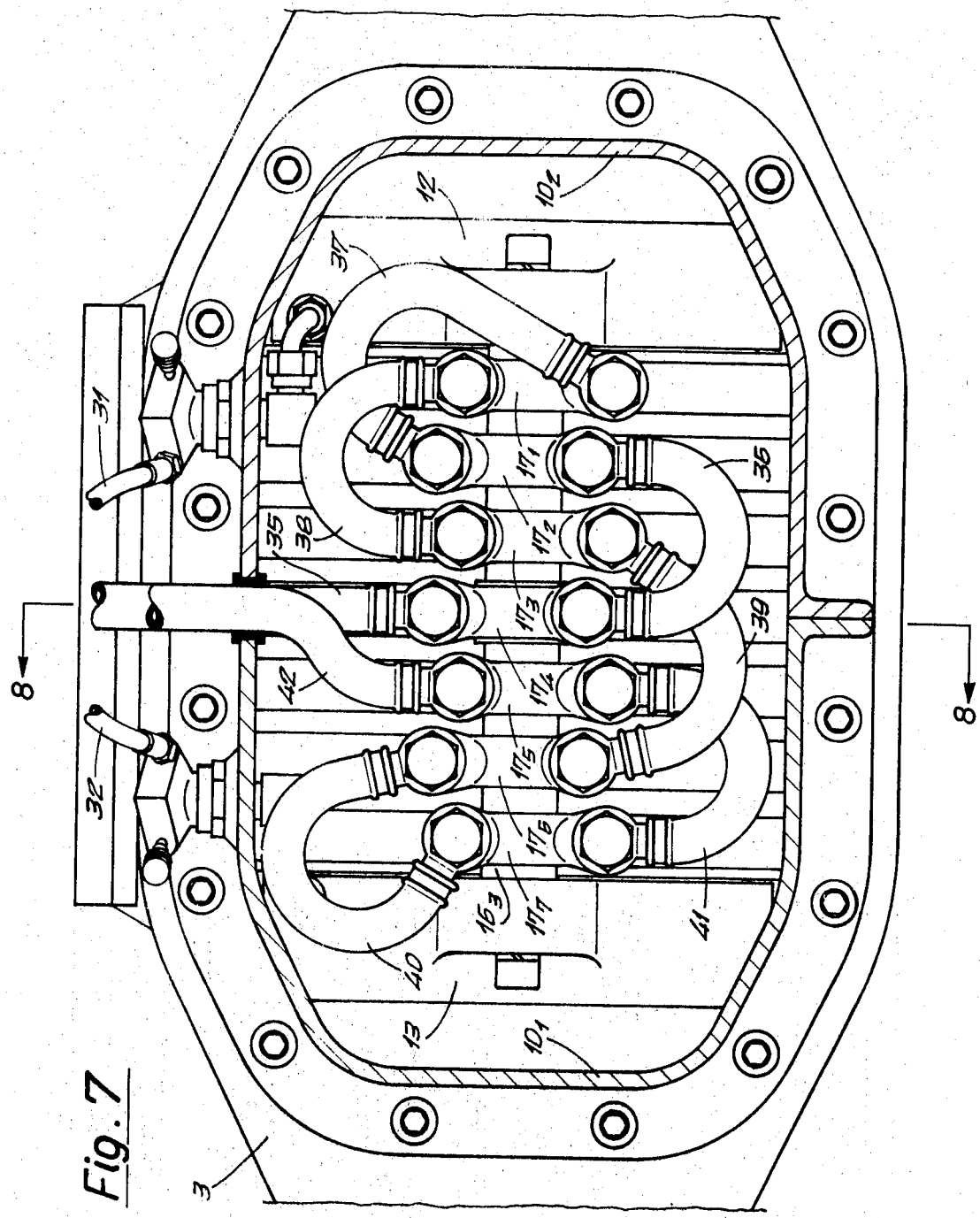
FIG. 7 is a plan view of the braking unit of FIG. 4 after removing the cover of the axle body.

Each time that the braking operation is started an electrical motor provided in the heat exchanger assembly (not shown) is switched on. The heat exchanger assembly preferably comprises a radiator having an electrically driven fan and a pump and a thermostat controlled switch. Referring to FIG. 7 the cooling water is delivered by the pump through the conduit 35 into the brake ring $17_4$. From there the water goes through conduit 36 into brake ring $17_2$, through conduit 37 into brake ring $17_1$, through conduit 38 into brake ring $17_3$, through conduit 39 into brake ring $17_6$, through conduit 40 into brake ring $17_7$ and finally through conduit 41 into brake ring $17_5$ and through the drain conduit 42 back to the radiator and the pump.

Figure 8:
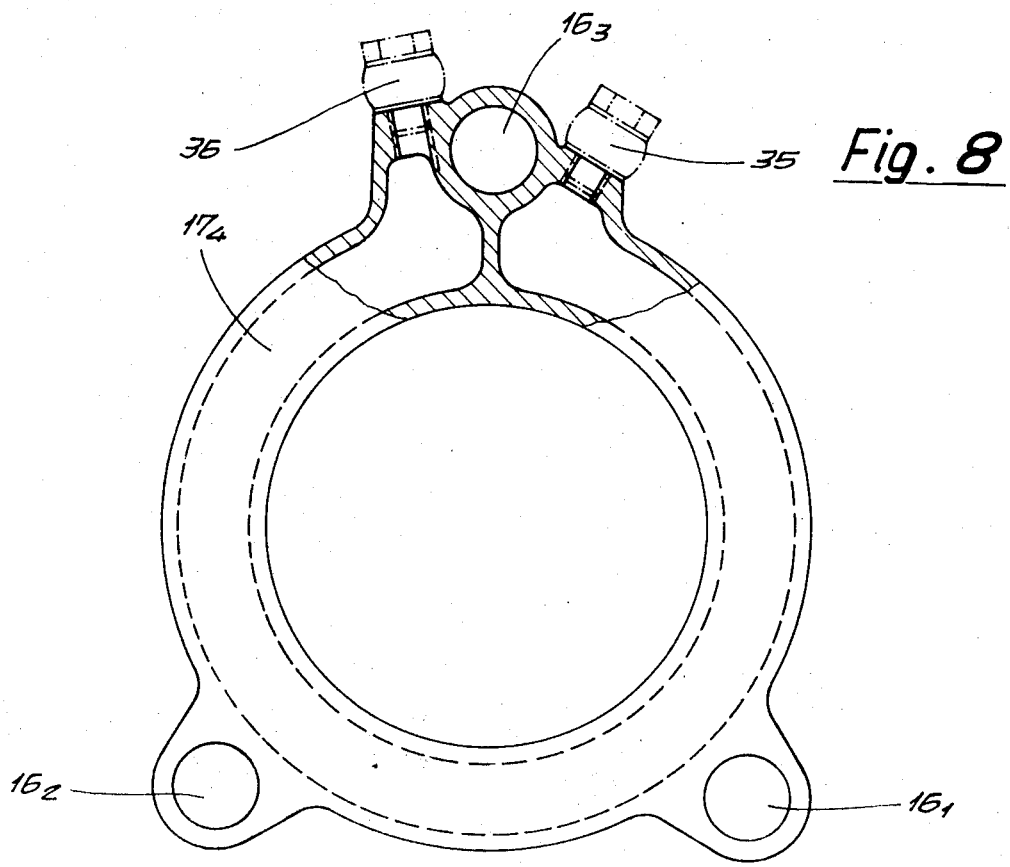
FIG. 8 is a cross-section through a brake ring of the braking unit of FIGS. 4-7, taken along line 8—8 of FIG. 7.

FIG. 8 is a section through the brake ring $17_4$ showing the connections of the conduit 35 and 36. The switch only stops the fan and the pump when the thermostat indicates a water temperature below a predetermined value.

The wearing of the laminations can be checked as usual with a stop which is actuated, i.e. by the brake rings $17_1$ and $17_7$. Owing to the encapsuled arrangement of the laminations and to the water cooling, the laminations have to be changed only after a long driving distance. In that case, the axle shaft parts 8 and 9 with the gears 7 at their ends are on both sides pulled outwardly through the axle body 3. After loosening the screws $10_5$ the cover $10_1$, $10_2$ is removable from the axle body and therewith the complete brake assembly.

An without disconnecting the conduits, the laminations are changeable when the packet of the brake rings is loosened far enough for the laminations to be shiftable.

Figure 9:
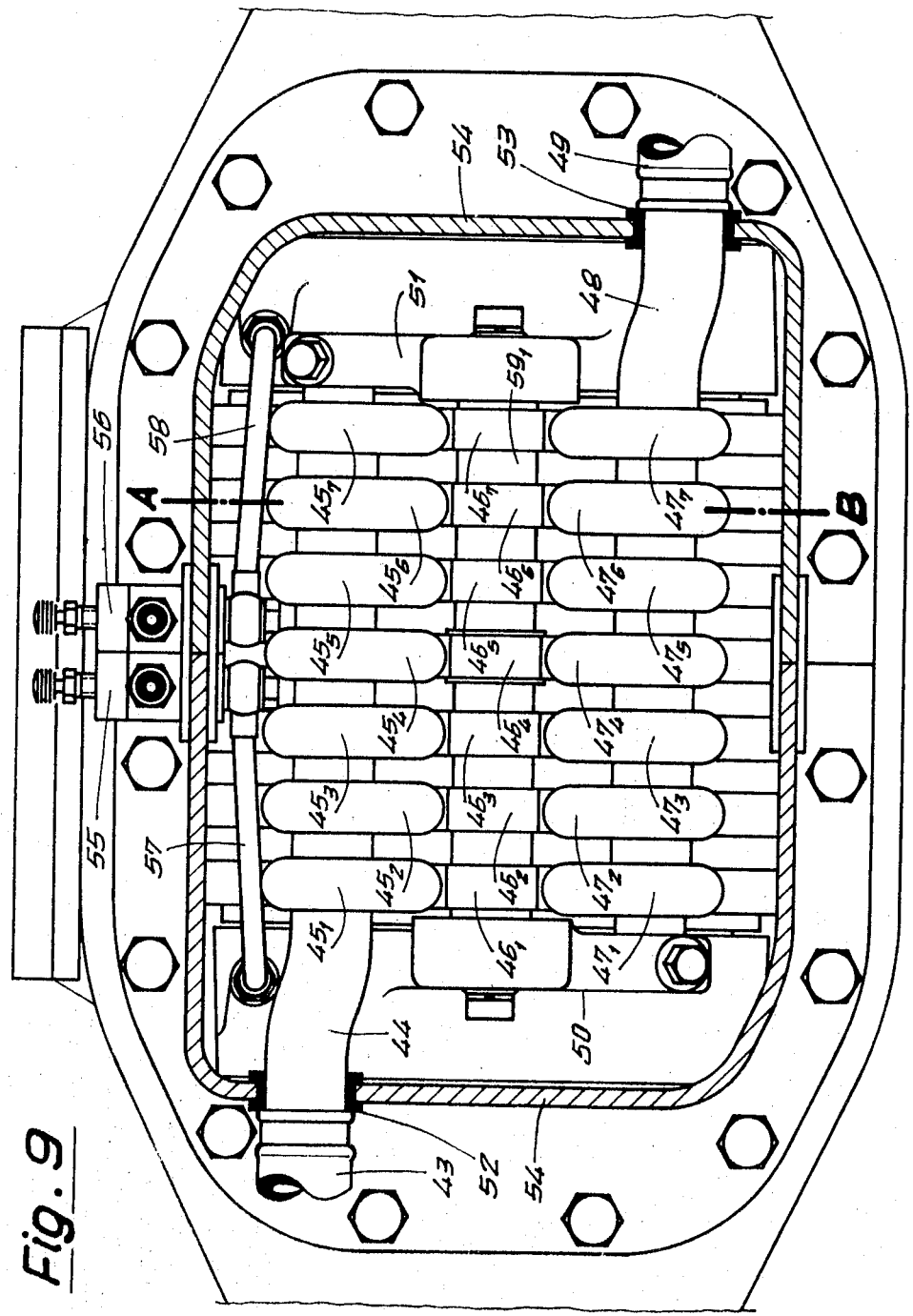
FIG. 9 is a plan view similar to FIG. 7, but showing a modified cooling system of the braking unit.
Figure 10:
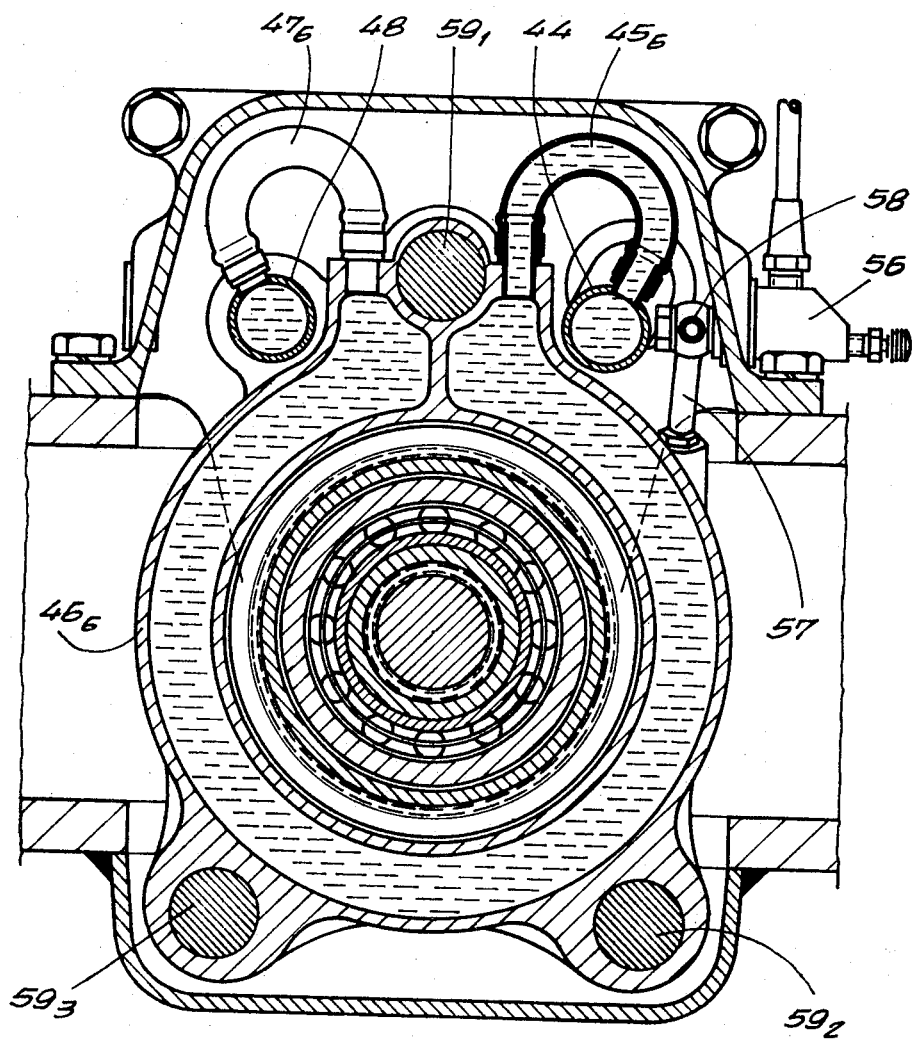
FIG. 10 is a sectional view taken along line A-B of FIG. 9.

FIGS. 9 and 10 show another embodiment of the water cooled disc brake already tested in practice and provided for the mounting in a non-driven axle body. Except for the modified design of the conduit members this embodiment corresponds with the embodiment of FIGS. 4 to 8 so that only the modified cooling circulation is described below in detail.

In the embodiment of FIGS. 4 to 8 the liquid compartments of the brake rings are connected in series one after the other.

In the embodiment of FIGS. 9 and 10, each brake ring is connected to the supplying conduit and to the drain conduit, that is the brake rings are connected in parallel between these lines, guaranteeing the same temperature for each brake ring during braking operation. The cooling water is supplied from the conduit 43 into the pipe conduit 44. From there it passes into the conduits $45_1$ to $45_7$ and passes the liquid compartments of the brake rings $46_1$ to $46_7$ for cooling. Through the conduits $47_1$ to $47_7$ the pipe 48 and the conduit 49 the water is guided to the radiator. The supply conduit 44 and the drain conduit 48 are fastened on their one end to the brake carriers 50 and 51 respectively, and on their other end by means of the rubber rings 52 and 53 to the cover 54. The hydraulic oil for operating the brake is delivered through the sockets 55 and 56 and the pipe conduits 57 and 58 to the annular cylinders arranged in the brake carriers. The brake rings $46_1$ to $46_7$ are carried by the three cylindrical bolts $59_1$ to $59_3$.

EXAMPLE

Figure 6:
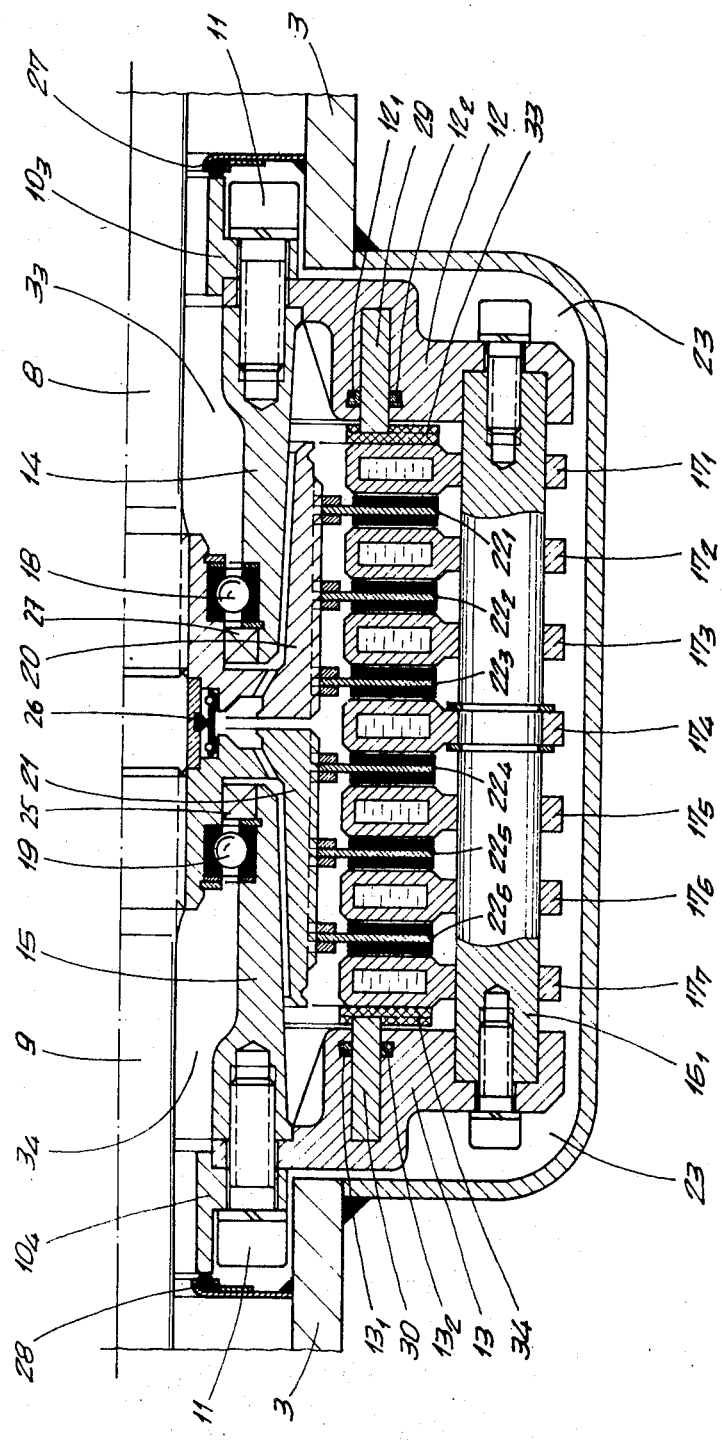
FIG. 6 is an enlarged fragmentary vertical view through the axle body and the braking unit of FIG. 4.

A brake assembly handling 250 h.p. permanent brake power was built according to FIGS. 4 to 6 and used for a 25,000 lb. axle provided with the cooling system of FIGS. 9 and 10.

The specific load was 78 h.p./sq. inch. The maximum braking moment to brake the wheels into standstill was 5,000 ft. lbs. per wheel. With a planetary transmission of 1:4 and an adhesion coefficient of 0.9 a braking moment of 20,000 ft. lb. can be managed which affords a hydraulic pressure of 1,000 lb./sq. inch.

FIGS. 11 to 13 illustrate another embodiment of the brake arrangement, provided for a truck-tractor with semi-trailer. The truck-tractor 135 has a steerable front axle 137 and two driven rear axles 138 and 139 wherein only the axle 138 is steerable. The rigid front axle 137 is provided with wheel brakes, the two rear axles 138 and 139 are of the so-called De-Dion type and provided with brakes 142 assembled to the gear box. The semi-trailer 136 has two rigid axles 140 and 141. Located within their axle bodies are water cooled disc brakes of the above described type. The radiator 143 is provided with an electrically driven fan and a pump.

At the beginning of the braking operation the water cooled disc brakes of the semi-trailer 136 are actuated, afterwards additionally the brakes 142 of the truck 135 and later on the wheel brakes are engaged.

Figure 14:
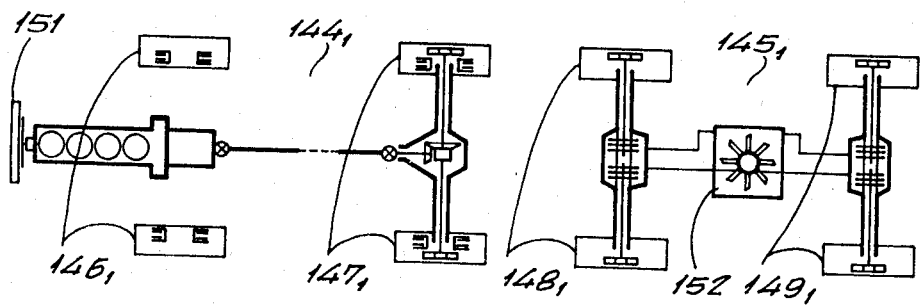
FIG. 14 is a schematic view from below of a truck-trailer combination employing a brake arrangement according the invention.

FIG. 14 illustrates a further embodiment of the brake arrangement showing a truck-trailer combination having a truck $144_1$ and a two-axled trailer $145_1$. The front axle $146_1$ and the rear axle $147_1$ of the truck are braked by normal wheel brakes. In contrast thereto are the wheels $148_1$ and $149_1$ braked by water cooled disc brakes of the above described type located in the axle body with their heat being dissipated by the radiator 152 provided on the trailer. At the beginning of the braking operation only the water cooled disc brakes of the trailer, being suitable for permanent load, are actuated and afterwards additionally the wheel brakes of the truck are engaged.

Figure 16:
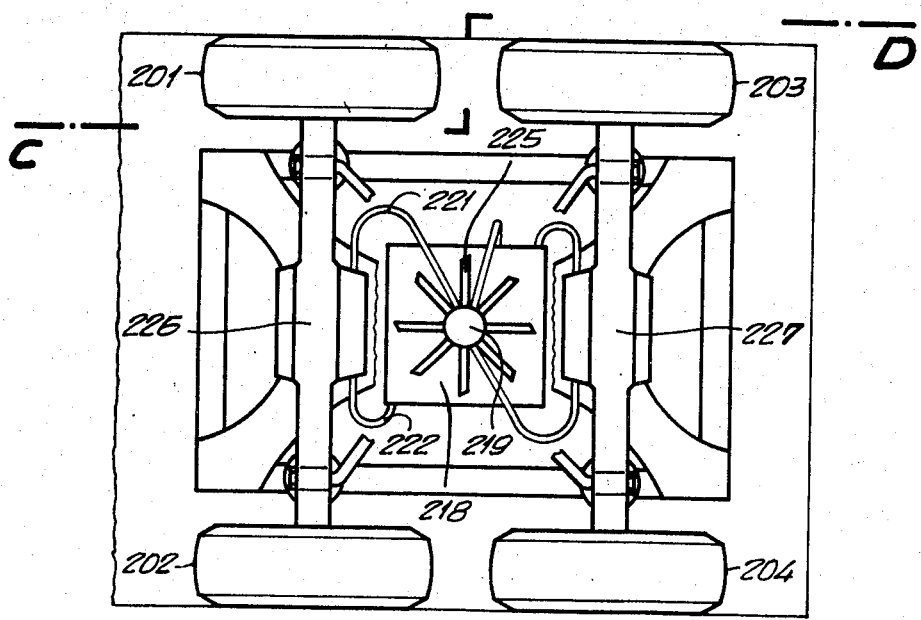
FIG. 16 is a schematic view from below of the semi-trailer axle of FIG. 15.
Figure 17:
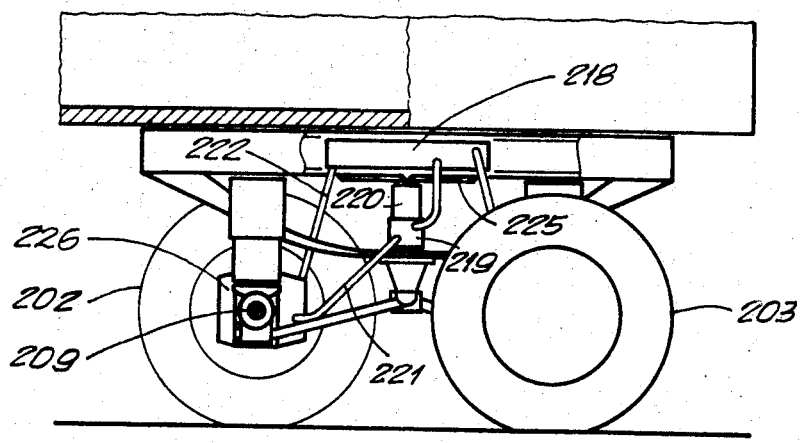
FIG. 17 is a sectional view taken along line C-D of FIG. 16.

In connection with the use of brake assemblies for heavy vehicles and with respect to the demand for increased average speed and high payloads there arises the problem — additional to the difficulty of carrying off the braking heat developed during a lasting downhill drive — to use the adhesive force at the wheels during braking action only to such an extent that there remains always a still sufficient portion of the vertical adhesive component necessary for a safe maintenance of the side location. FIGS. 15 to 17 show an embodiment of the brake arrangement according to the invention illustrating a solution of this problem for a semi-trailer unit. The wheels 201, 202, 203 and 204 are connected by means of the axle shaft parts 209, 210, 211 and 212 with the water cooled disc brakes 205, 206, 207 and 208 of the above described type, respectively. The brakes 205, 206 and 207, 208 are located in the axle bodies 226 and 227, respectively (FIGS. 16, 17). The axle shaft parts 209, 210, 211 and 212 are driven by the planetary transmission gearings $201_1$, $202_1$, $203_1$ and $204_1$ located in the wheels and of the type as shown in FIG. 4. Each wheel is controlled against blocking by an anti-locking equipment. The anti-locking equipment comprises the electro-mechanical sensors $213_3$, $214_3$, $215_3$ and $216_3$ provided in the wheels 201, 202, 203 and 204, respectively. The sensors are engaged with the inner gears of the planetary transmissions and deliver electrical signals via lines $213_4$, $214_4$, $214_4$, $215_4$, and $216_4$, if a predetermined angular deceleration is exceeded. These signals trigger the respective electromagnetic acutating means $213_5$, $214_5$, $215_5$ and $216_5$ which operate on the pneumatic steering valves $213_1$, $214_1$, $215_1$ and $216_1$, respectively. Thus, the pressure in the respective brake conduit is lowered thereby for a short moment releasing the brakes in the respective wheels and enabling the adhesion force between the tires and the ground to be restored. If necessary there may be used, of course, others than electromechanical sensors.

The actuation of the pneumatic circuit and the brakes is only described for the brake 205. The steering valve $213_1$ is in connection with the air compartment of the diaphragm compressed air cylinder 213. The diaphragm $213_6$ has the hydraulic piston $213_7$ which operates through conduit $205_9$ on the annular cylinder $205_8$ for the actuation. A detailed description of the brake assembly was given in connection with FIG. 6, so that it is not explained here in detail. The brake assembly comprises the brake rings $205_4$, $205_5$ and $205_6$, the laminations $205_1$, $205_2$ and $205_3$ and the brake ring $205_7$ which provides a stop for the left hand and the right hand laminations and brake rings of the brakes during actuation.

The water cooled brake rings are made of a heat conducting material, preferably of a Cu-Cr alloy. The braking air pressure actuated by the driver of the vehicle is delivered through conduit 217 and passes through the conduit $203_2$ and the steering valve $213_1$ to the diaphragm compressed air cylinder 213 for the brake 205.

Instead of the use of diaphragm compressed air cylinders the brake arrangement may be equipped as well with spring cylinders operated by diaphragm or piston members, wherein the driver's cab is equipped with a cylinder for the braking of the trailer which cylinder is actuated as usual by reverse compression.

The cooling circulation is of the type as shown in FIG. 9 and only described for the brake 205 whilst the liquid compartments of the other brakes are arranged in parallel fluid communication thereto.

The liquid compartments of the brake rings $205_4$, $205_5$ and $205_6$ are arranged in parallel between the supplying conduit 221 and the drain conduct 222. The radiator 218 is provided with a thermostat 224 which starts at a predetermined temperature the motor 220 for the drive of the pump 219 and the fan 225.

What I claim is:

1. A vehicle brake arrangement, comprising in combination:

a vehicle provided with at least one pair of oppositely arranged non-driven wheels and an elongated hollow axle body fixed to the vehicle and extending between said wheels;

a liquid-cooled disc brake located in the axle body, said disc brake comprising a set of brake rings fixed against rotation but movable axially in the longitudinal direction of the axle body, said brake rings including liquid compartments, and including supply means for delivering liquid into said compartments and drain means for removing liquid therefrom, to thereby circulate cooling fluid therethrough;

a divided axle shaft located in the axle body and consisting of a left hand and a right hand part, each part having an inner end at the disc brake and an outer end connected one to each of said wheels, and each of said axle shaft parts being movable axially outwardly through the axle body;

at least one brake lamination having friction linings and removably fixed on the inner end of each of said axle shaft parts for rotation therewith, said brake laminations being located between said brake rings;

said axle body having an opening closed by a removable cover through which opening the braking assembly can be removed after the axle shaft parts have been pulled out axially beyond the braking assembly, and wherein the complete braking assembly including the brake rings is removable with the said compartments still containing the liquid coolant and operatively connected to said supply and drain means.

2. A brake arrangement according to claim 1, wherein a planetary transmisstion gearing is located in each of said wheels, the outer ends of said shaft parts being connected to the transmission gearings causing the shaft parts to rotate with the wheels but with increased speed.

3. A brake arrangement according to claim 1, including a hub member pushed onto the right axle shaft part and a similar but reverse shaped hub member pushed onto the left axle shaft part which hub members have mounted thereon an equal number of axially movable laminations for rotation therewith.

4. A brake arrangement according to claim 1, said cover comprising a left part and a symmetrically formed right part, said right cover part having mounted a right flange and a right annular brake carrier by means of fastening members, said right flange surrounding the right shaft part like a sleeve, and said left cover part having mounted a symmetrically formed left flange and a symmetrically formed left annular brake carrier by means of fastening members, said left flange surrounding the left shaft part like a sleeve, a number of circumferentially spaced bolts fastened between said carriers and carrying an odd number of hollow brake rings, the middle brake ring being fastened on said bolts and reaching between the two inner laminations while the other brake rings arranged left and right of said middle brake ring are slidable on said bolts and reach between the laminations so that each lining of each lamination faces a surface of a brake ring.

5. A brake arrangement according to claim 4, including hydraulic actuating means within each brake carrier for moving the laminations and brake rings towards the fastened middle brake rings and effecting contact between all said laminations and brake rings.

6. A brake arrangement according to claim 1, wherein the liquid compartments of a plurality of brake rings are connected in series between said supply means in the form of a supplying conduit and a said drain means in the form of a drain conduit.

7. A brake arrangement according to claim 1, wherein the liquid compartments of a plurality of brake rings are connected in parallel between a supply means in the form of a supplying conduit and a drain means in the form of a drain conduit.

8. A brake arrangement according to claim 1, wherein planetary transmissions gearings are located in the wheels and brake ring actuating means are provided for the braking of the axle shaft parts, and including sensor means for reacting to decelerations, and control means for influencing said actuating means, said control means reacting on signals delivered by said sensors and causing a release of the brake of the blocked wheel.

9. A brake arrangement for a truck-trailer combination consisting of a truck and a trailer, comprising:
a trailer provided with at least one pair of oppositely arranged non-driven wheels and an elongated hollow axle body fixed to the vehicle and extending between said wheels;
a liquid-cooled disc brake located in the axle body, said disc brake comprising a set of brake rings fixed against rotation but movable axially in the longitudinal direction of the axle body, said brake rings including liquid compartments, and including supply means for delivering liquid into said compartments and drain means for removing liquid therefrom, to thereby circulate cooling fluid therethrough;
a divided axle shaft located in the axle body and consisting of a left hand an a right hand part, each part having an inner end at the disc brake and an outer end connected one to each of said wheels, and each of said axle shaft parts being movable axially outwardly through the axle body;
at least one brake lamination having friction linings and removably fixed on the inner end of each of said axle shaft parts for rotation therewith, said brake laminations being located between said brake rings;
said axle body having an opening closed by a removable cover through which opening the braking assembly can be removed after the axle shaft parts have been pulled out axially beyond the braking assembly, and wherein the complete braking assembly including the brake rings is removable with the said compartments still containing the liquid coolant and operatively connected to said supply and drain means; and
actuating means for moving said brake rings in the axial direction against the laminations to brake both wheels, and means connecting said actuating means to a further actuating means at the said truck.

10. A brake arrangement according to claim 9, including pairs of oppositely arranged non-driven wheels, each having an axle body per pair and a said liquid cooled disc brake in each axle-body, and said actuating means have a common connection with the said further actuating means of a brake arrangement on the said truck.

11. A brake arrangement according to claim 9, wherein sensor means are located in the wheels or on the axle shaft parts for reacting to decelerations, and control means for influencing the actuating means, said control means reacting to signals delivered by the sensor means and causing a release of the brake of the blocked wheel.

12. A brake arrangement according to claim 9, wherein a radiator and connecting conduits provide a cooling system including the liquid compartments of all brake rings.

* * * * *